US006657684B2

United States Patent
Maeda et al.

(10) Patent No.: US 6,657,684 B2
(45) Date of Patent: Dec. 2, 2003

(54) REFLECTIVE LCD WITH REFLECTOR HAVING PARTICULAR DIRECTION TO ILLUMINATION DEVICE

(75) Inventors: Tsuyoshi Maeda, Yamanashi-ken (JP); Kimitaka Kamijo, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/223,635

(22) Filed: Aug. 20, 2002

(65) Prior Publication Data

US 2003/0048398 A1 Mar. 13, 2003

(30) Foreign Application Priority Data

Aug. 23, 2001 (JP) .......................................... 2001-253105

(51) Int. Cl.[7] ............................................. G02F 1/1335
(52) U.S. Cl. .......................................... 349/63; 349/113
(58) Field of Search .............................. 349/63, 113, 65; 362/31, 32

(56) References Cited

U.S. PATENT DOCUMENTS 6,108,059 A * 8/2000 Yang ............................ 349/65
6,151,089 A * 11/2000 Yang et al. .................. 349/113
6,266,108 B1 * 7/2001 Bao et al. ..................... 349/63

FOREIGN PATENT DOCUMENTS

JP     A-9-274179     10/1997

* cited by examiner

*Primary Examiner*—Toan Ton
(74) *Attorney, Agent, or Firm*—Oliff & Berridge, PLC

(57) ABSTRACT

The invention provides a reflective liquid crystal display device that can provide a bright image regardless of an operating environment without generating location-dependent uneven brightness or moiŕ ófringes. A liquid crystal display device of the present invention includes a liquid crystal cell in which liquid crystal is sandwiched between a pair of substrates, a front light having a light source and a light guide plate which are provided at the upper surface side of the liquid crystal cell, and a reflector provided at the lower surface side of the liquid crystal cell. A plurality of projections are provided on the light guide plate of the front light so as to extend in one direction. A plurality of projections are provided on the reflector so as to extend in one direction. The extending direction of the projections of the light guide plate and the extending direction of the projections of the reflector are not parallel to each other.

15 Claims, 8 Drawing Sheets

REFLECTIVE LCD WITH REFLECTOR HAVING PARTICULAR DIRECTION TO ILLUMINATION DEVICE

BACKGROUND OF THE INVENTION

1. Field of Invention

The present invention relates to a liquid crystal display device and an electronic apparatus, and more particularly relates to a reflective liquid crystal display device having an illumination device (a front light) and a directional reflector.

2. Description of Related Art

Reflective liquid crystal display devices have low power consumption since they do not have light sources, such as back lights, and conventionally, have frequently been used for, for example, accessory display portions for various portable electronic apparatuses and devices. The reflective liquid crystal display devices, however, utilize external light, such as natural light or illumination light to perform display, thus having a problem in that visibility of the display is reduced at a location where the amount of external light is limited. Thus, a liquid crystal display device having an illumination device (front light) at the front surface of a reflective liquid crystal cell has been proposed. The front light serves to introduce light from a light source, which is arranged adjacent to one end surface of a light guide plate provided at the front surface of the liquid crystal cell, into the light guide plate. The light introduced therein is then radiated from a plate surface of the light guide plate toward the liquid crystal cell. The liquid crystal display device having the front light allows the liquid crystal cell to be viewed through the transparent light guide plate at a bright location. Thus, at a bright location, the liquid crystal display device can be used as a typical reflective liquid crystal display device, and at a dark location, the front light is turned on to illuminate the liquid crystal cell, thereby allowing the display to be viewed.

FIG. 10 shows an example of a conventional front light. A front light 100 of this example includes a light source 101, a light guide plate 102 for transmitting light from the light source 101 in the rightward direction of FIG. 10, and a reflector 103 arranged so as to surround the light source 101. A plurality of projections 105 are formed on the upper surface of the light guide plate 102 at regular intervals, each projection 105 having a triangular cross-section and having a gentle-slope portion 104a with a gentle oblique angle and a steep-slope portion 104b with oblique angle steeper than the gentle-slope portion 104a. The projections 105 are formed in a striped pattern so as to extend in a direction perpendicular to the surface of the paper of FIG. 10, and serve to change the reflection direction of light propagating within the light guide plate 102 and to emit the light from a plate surface of the light guide plate 102 to the outside thereof. That is, in the front light 100, when light emitted from the light source 101 is introduced into the light guide plate 102 from a side surface thereof, the light propagates while repeating total reflection within the light guide plate 102. Meanwhile, light that was incident on the gentle-slope portion 104a of each projection 105 and that was totally reflected is emitted from the lower surface of the light guide plate 102 as an illumination light.

Meanwhile, in a reflective liquid crystal display device, a technology for providing a bright display within a certain degree of a viewing angle by forming a large number of projections or depressions on a surface of a reflective film to thereby scatter reflected light has been conventionally adopted. However, from the viewpoint of effectively utilizing reflected light in an environment where reflected light is limited and presenting a bright display to a user's eyes, in lieu of a conventional technology in which projections or depressions each having a symmetric cross-section are formed to thereby scatter light isotropically, a technology for a so-called directional reflector has been proposed. In the technology, for example, projections each having an asymmetric cross-section, i.e., projections each having a saw-toothed cross-section and having a gentle-slope with a gentle oblique angle and a steep-slope with a steep oblique angle are formed, to impart anisotropy (hereinafter referred to as "directivity") to light scattering, thereby orienting reflected light to the user's eyes.

FIG. 11 is a view showing the effect of a directional reflector. For example, as shown in the figure, in a reflector 200 on which a large number of projections 201 each having a triangular cross-section are formed, the surfaces of the projections 201 serve as reflective surfaces. Designing the cross-sectional shape of each projection to have an asymmetric saw-tooth rather than to have an isosceles triangle can make the area of a gently-inclined reflective surface 202a larger enough than the area of a steeply-inclined reflective surface 202b. With an liquid crystal display device incorporating the reflector 200, in a typical operating environment, external light, such as, sunlight or illumination light, is incident on the screen from the upper direction (the direction of arrow A1 in FIG. 11) of the screen, and a user commonly views the screen from a generally frontward direction (the direction of arrow A2 in FIG. 11) of the screen. Thus, the external light from the upper direction of the screen is reflected on the gentle-slope surfaces of the reflective layer, thus increasing the amount of reflected light especially in the frontward direction of the panel. As a result, the user can view a bright image.

SUMMARY OF THE INVENTION

The conventional reflective liquid crystal display device described above has the front light and the directional reflector and is thus superior in that, in theory, it can provide a bright image regardless of an operating environment. However, in practice, when a user views the screen, there are some problems in that, for example, uneven brightness is generated depending on a location or moiréfringes are viewed. Thus, the conventional liquid crystal display device cannot necessarily be said to have good display quality.

The present invention has been made to overcome the foregoing problems, and an object thereof is to provide a reflective liquid crystal display device that can provide a bright image regardless of an operating environment without generating, for example, location-dependent uneven-brightness or moiréfringes.

To achieve the above object, a reflective liquid crystal display device of the present invention includes a liquid crystal cell in which liquid crystal is sandwiched between a pair of substrates consisting of an upper substrate and a lower substrate which are arranged so as to oppose each other, an illumination device which is provided at the upper surface side of the liquid crystal cell and which has a light source and a light guide plate, and a reflective layer provided below the liquid crystal of the liquid crystal cell. A plurality of projections or depressions are provided at the light guide plate of the illumination device so as to extend in one direction and a plurality of projections or depressions are provided at the reflective layer so as to extend in one direction. The extending direction of the projections or depressions of the light guide plate and the extending direction of the projections or depressions of the reflective layer are not parallel to each other in plan view. The "projections or depressions of the light guide plate" herein serve to change the reflection direction of light propagating within the light guide plate so that reflected light is emitted from a plate surface of the light guide plate to the outside thereof. The "projections or depressions of the reflective layer" serve to constitute reflective surfaces that impart directivity.

The present inventors investigated the cause of generation of location-dependent uneven brightness or moiréfringes in a liquid crystal display device having a front light and a directional reflector. As a result, we found that, in the conventional configuration, since the extending direction of projections or depressions provided at a light guide plate of a front light and the extending direction of projections or depressions provided at a directional reflector are parallel to each other, light interference is generated, thus resulting in location-dependent uneven brightness or moiréfringes. Accordingly, in the liquid crystal display device of the present invention, since the extending direction of the projections or depressions of the light guide plate of the illumination device (front light) and the extending direction of the projections or depressions of the reflective layer (directional reflector) are not parallel to each other, no interference is generated. This arrangement, therefore, can prevent the generation of location-dependent uneven brightness or moiré fringes.

In the present invention, the above effects and advantages can be achieved by only arranging the extending direction of the projections or depressions of the light guide plate of the illumination device and the extending direction of the projections or depressions of the reflective layer such that they are not parallel to each other. In theory, as opposed to the conventional design in which the extending directions are parallel to each other, either one of the extending direction of the projections or depressions of the light guide plate and the extending direction of the projections or depressions of the reflective layer may be displaced from the other so as to be non-parallel to each other. However, since the direction in which a user commonly views the screen is usually fixed, the direction of the directivity of the reflection light is preferably fixed. In this respect, the extending direction of the projections or depressions of the light guide plate is preferably displaced from the conventional direction without changing the extending direction of the projections or depressions of the reflective layer such that the extending directions thereof are not parallel to each other.

In addition, as long as the extending direction of the projections or depressions of the light guide plate and the extending direction of the projections or depressions of the reflective layer are not parallel, that is, the angle formed by the extending directions thereof is other than 0°, it is possible to, at least, reduce the generation of location-dependent uneven brightness or moiré fringes, and is possible to ensure the prevention of the generation thereof if the angle is greater than 0° by a certain degree. However, if the angle is 90°, the efficiency of utilizing light is extremely reduced, so that the display becomes significantly dark. Thus, it is desirable to set the angle to be smaller than 90°. The reason is as follows. In the design of a directional reflector, the extending direction of the projections or depressions is generally designed to be perpendicular to the direction in which light propagates within the light guide plate of the front light. Thus, when the angle formed by the extending directions thereof is set to 90°, the extending direction of the projections or depressions of the light guide plate becomes parallel to the propagation direction of light, thereby significantly reduce the efficiency of emitting light from the light guide plate.

As a specific configuration for causing light reflected from the reflective layer to have directivity, the configuration in which each of the projections or depressions of the reflective layer has an asymmetric cross-sectional shape and has a gentle-slope portion with a gentle oblique angle and a steep-slope portion with an oblique angle steeper than the gentle-slope portion may be adopted.

Such projections or depressions can be easily formed using a photolithographic technique or a transcription technique. Optimizing the oblique angle and the area of each gentle-slope portion can adjust the direction of directivity and brightness of reflected light as appropriate.

When the reflective layer is provided, it may be provided at the inner surface side of the lower substrate, or may be provided at the outer surface side of the lower substrate.

When the reflective layer is provided at the inner surface side of the lower substrate, it is possible to overcome the problem of parallax so that a sharp image can be provided. When the reflective layer is provided at the outer surface side of the lower substrate, it is possible to facilitate the manufacture of the device.

An electronic apparatus of this invention is characterized in that it includes the liquid crystal display device of the present invention.

This configuration can achieve an electronic apparatus having a liquid display portion that provides a bright image regardless of an operating environment without generating location-dependent uneven brightness or moiré fringes.

DETAILED DESCRIPTION OF PREFERRED EMBODIMENTS

First Embodiment

A first embodiment of the present invention will now be described with reference to FIGS. 1 to 3.

This embodiment is an example of a passive-matrix reflective liquid crystal display device in which an external reflector is provided on the outer surface of a lower substrate.

Figure 1:
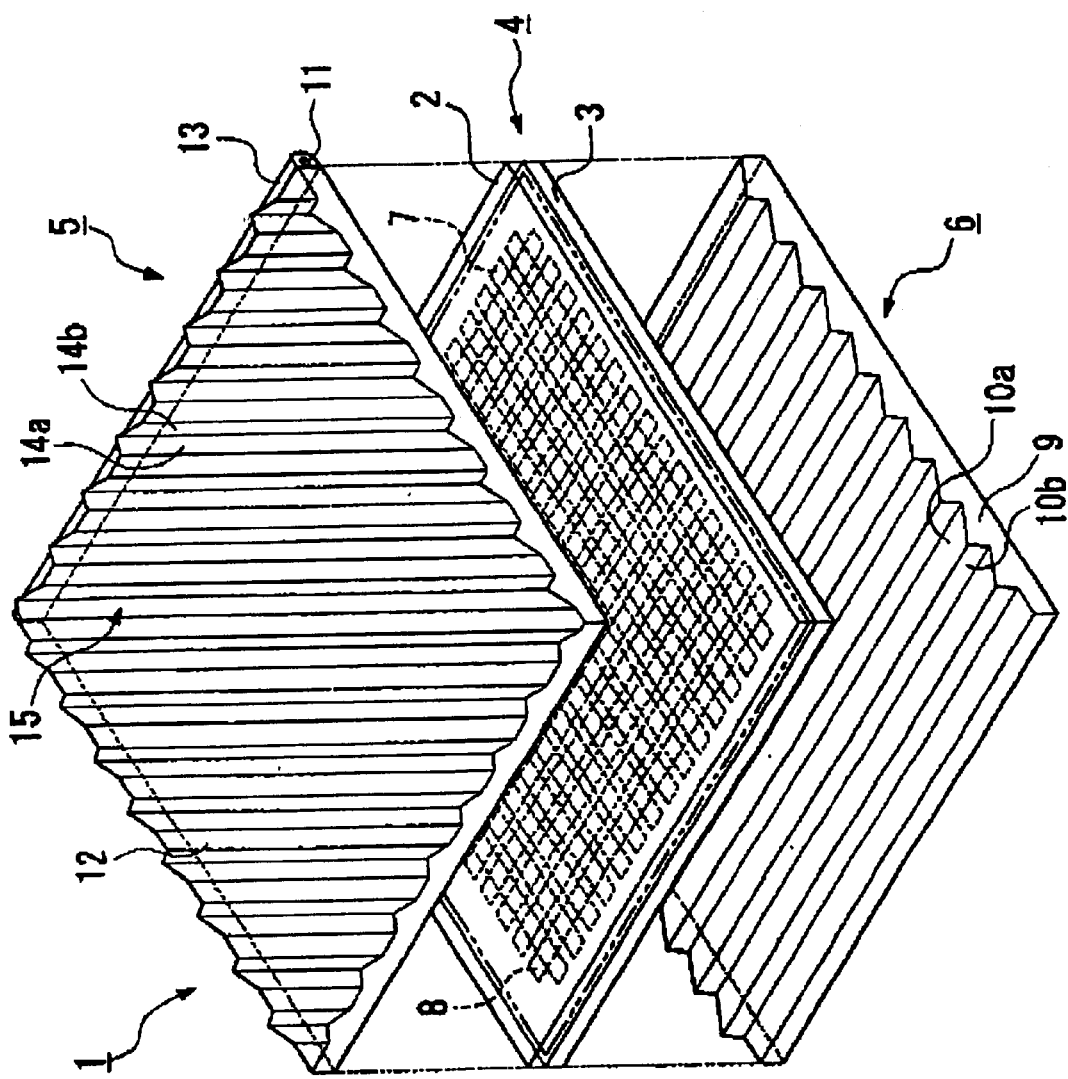
FIG. 1 is an exploded perspective view of the schematic configuration of a liquid crystal display device according to a first embodiment of the present invention.

FIG. 1 is an exploded perspective view illustrating the schematic configuration of a liquid crystal display device of this embodiment. FIG. 2 is a plan view showing the relationship between the extending direction of projections of a light guide plate provided in the LCD and the extending direction of projections of a reflector provided therein. FIG. 3 is a sectional view taken along line B–B' shown in FIG. 1. In all the drawings below, the film thickness and dimensional ratio of each element are varied as necessary for the sake of clarity of the drawings. As shown in FIG. 1, a liquid crystal display device 1 of this embodiment includes a liquid crystal cell 4 in which liquid crystal is sandwiched between a pair of substrates consisting of an upper substrate 2 and a lower substrate 3, which are arranged so as to oppose each other. The liquid crystal display device 1 further includes a front light 5 (illumination device) arranged at the front surface side (upper surface side) of the liquid crystal cell 4 and a reflector 6 arranged at the back surface side (lower surface side) of the liquid crystal cell 4. The liquid crystal cell 4 of this embodiment is suitable for use in a passive-matrix type display. A plurality of segment electrodes 7 are formed in a striped pattern on the lower substrate 3, and a plurality of common electrodes 8 are formed in a striped pattern on the upper substrate 2 in a direction perpendicular to the segment electrodes 7.

While not shown, lead wires that are electrically connected to the segment electrodes 7 and the common electrodes 8 are formed at the peripheral edges of the substrates. Additionally, semiconductor elements for driving the segment electrodes 7 and the common electrodes 8 may be provided. While not shown in FIG. 1, a retardation film and a polarizer are sequentially arranged between the liquid crystal cell 4 and the front light 5 from the upper surface side of the liquid crystal cell 4, and a polarizer is arranged between the liquid crystal cell 4 and the reflector 6.

The reflector 6 of this embodiment is a so-called directional reflector that causes reflected light to have directivity. A plurality of projections 9, each having a saw-toothed cross-section, are formed on the upper surface of the reflector 6 so as to extend in one direction, and the surfaces of the plurality of projections 9 serve as reflective surfaces. Each of the projections 9 has an asymmetric cross-sectional shape. The area of a gentle-slope portion 10a having a gentle oblique angle is larger than the area of a steep-slope portion 10b having a steep oblique angle.

The front light 5 of this embodiment includes a light source 11, such as a white LED (light emitting diode), cold cathode tube, or organic EL (electroluminescent) element. The front light 5 further includes a light guide plate 12 for transmitting light emitted from the light source 11 from one side surface adjacent to the light source 11 toward the opposing side surface, and a reflector 13 arranged so as to surround the light source 11. A plurality of projections 15 are formed on the upper surface of the light guide plate 12 at regular intervals, each projection having a saw-toothed cross-section and having a gentle-slope portion 14a with a gentle oblique angle and a steep-slope portion 14b with an oblique angle steeper than the gentle-slope portion 14a. The projections 15 serve to change the reflection direction of light propagating within the light guide plate 12 and to emit the light to the outside of the light guide plate 12, and are arranged in parallel to one another.

Figure 2:
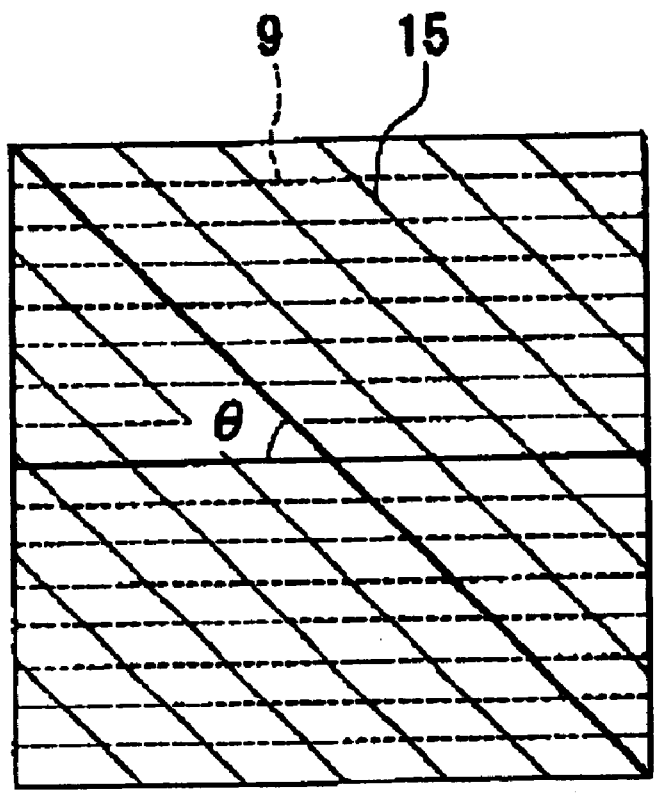
FIG. 2 is a plan view showing the relationship between the extending direction of projections of a light guide plate and the extending direction of projections of a reflector of the liquid crystal display device.

FIG. 2 is a plan view showing the relationship between the extending direction of the projections 15 of the light guide plate 12 of the front light 5 and the extending direction of the projections 9 of the reflector 6. In FIG. 2, the extending direction of the projections 15 of the light guide plate 12 of the front light 5 is indicated by solid lines, and the extending direction of the projections 9 of the reflector 6 is indicated by broken lines. As shown, the pitch between the projections 15 of the light guide plate 12 and the pitch between the projections 9 of the reflector 6 are different from each other. While the extending directions thereof in the conventional liquid crystal display device are set to be parallel to each other, the extending directions in the liquid crystal display device of this embodiment are set so as to cross each other at a certain angle θ. The angle θ needs to be greater than 0° and smaller than 90°, and is more desirably in the range of 10° to 45°.

Figure 3:
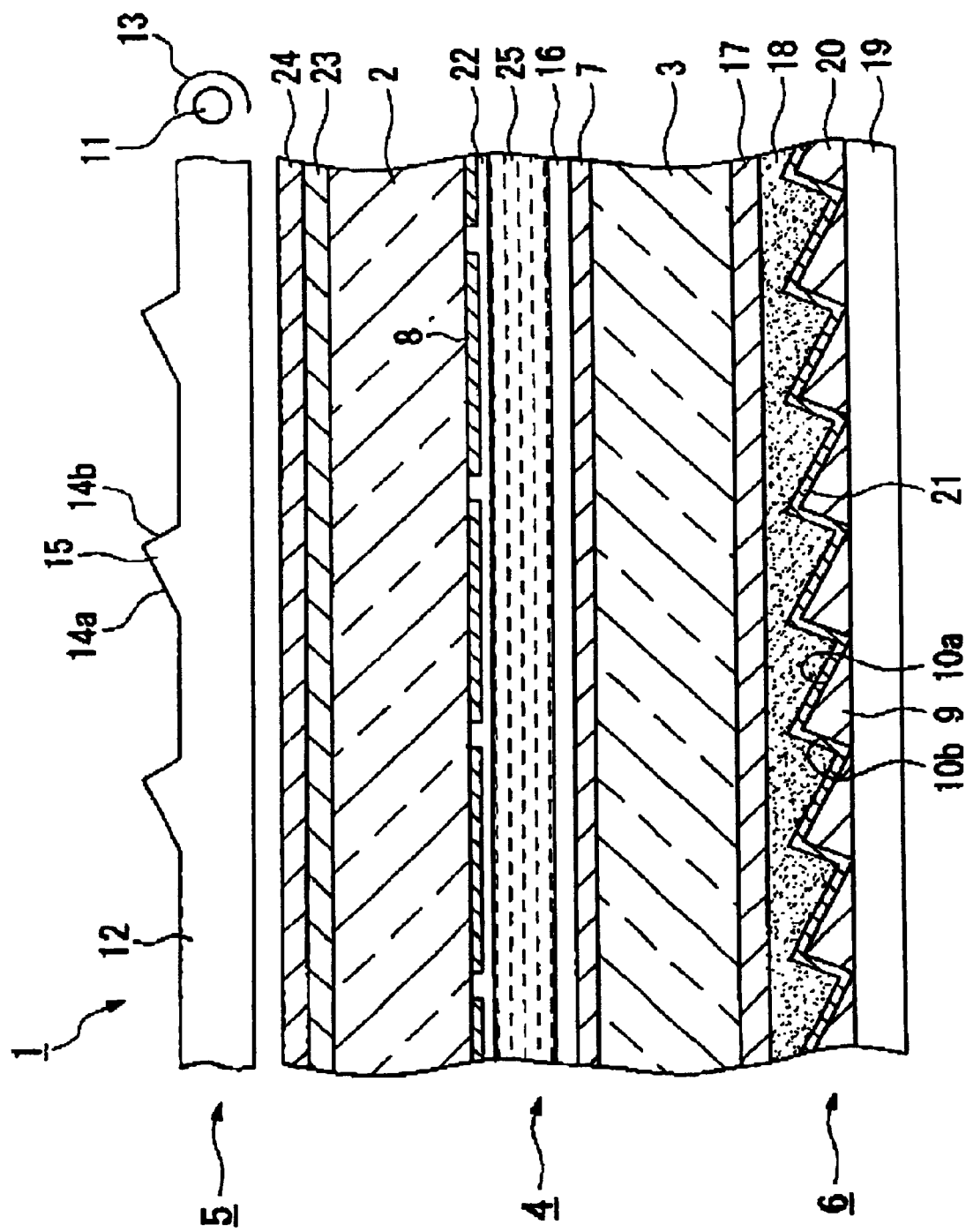
FIG. 3 is a cross-sectional view taken along line B–B' of the liquid crystal display device shown in FIG. 1

With regard to the sectional structure of the liquid crystal display device 1 of this embodiment, as shown in FIG. 3, the segment electrodes 7, which are made of indium tin oxide (hereinafter simply referred to as "ITO"), are formed in a striped pattern on the inner surface of the lower substrate 3, which is a transparent substrate made of glass, plastic, or the like, in the lateral direction along the surface of the paper. On the segment electrodes 7, an alignment layer 16, such as polyimide layer, having a surface that has been subjected to a rubbing process is formed. A polarizer 17 is arranged on the outer surface of the lower substrate 3, and on the outer surface of the polarizer 17, the reflector 6 is further arranged with an adhesive layer 18 interposed therebetween. More specifically, the reflector 6 is configured as follows. A resin layer 20 is formed on a substrate 19, and the resin layer 20 defines the projections 9 each having a saw-toothed cross-section. A reflective layer 21 made of a metal film, which includes aluminum, silver, or the like having a high light-reflectance, is formed on the surfaces of the projections 9. The projections 9 defined by the resin layer 20 can be formed using a photolithographic technique with a gray mask or a transcription technique. Particles or the like of a material having a refractive index different from an adhesive that serves as a base material can be mixed in the adhesive layer 18, to thereby provide a scattering effect of the reflected light.

Meanwhile, the common electrodes 8, which are made of ITO films, are formed in a striped pattern on the inner surface of the upper substrate 2, which is a transparent substrate made of glass, plastic, or the like, in the direction perpendicular to the surface of the paper. Over the common electrodes 8, for example, an alignment layer 22, which is made of polyimide or the like, having a surface that has been subjected to a rubbing process, is formed. A retardation film 23 and a polarizer 24 are sequentially arranged over the outer surface of the upper substrate 2 from the substrate side, and the front light 5 described above is arranged above the outer surface of the polarizer 24.

Liquid crystal 25, such as STN (super twisted nematic) liquid crystal is enclosed between the upper substrate 2 and the lower substrate 3.

With the liquid crystal display device of this embodiment, when the front light 5 is not turned on, external light, such as sunlight or illumination light is incident on the liquid crystal display device from the upper direction of the screen, passes through the light guide plate 12 and the liquid crystal cell 4, and is reflected by the reflector 6. The reflected light again passes through the liquid crystal cell 4 and the light guide plate 12, and is emitted in a generally frontward direction (the direction of arrow A2 in FIG. 3) of the screen, which is a direction in which a user views the screen. On the other hand, when the front light 5 is turned on, light from the light source 11 is emitted from the gentle-slope portions 14a of the projections 15 of the light guide plate 12 to the lower surface side of the light guide plate 12, passes through the liquid crystal cell 4, and is reflected by the reflector 6. The reflected light then passes through the liquid crystal cell 4 and the light guide plate 12 and is emitted in a generally frontward direction of the screen. With this arrangement, the user can view a bright image due to the increased amount of reflected light in the frontward direction of the panel, regardless of whether the front light is turned on or off.

In the liquid crystal display device of this embodiment, the extending direction of the projections 15 of the light guide plate 12 of the front light 5 and the extending direction of the projections 9 of the reflector 6 are not parallel to each other, but are arranged to have a certain angle therebetween. This eliminates light interference, thereby making it possible to prevent the generation of location-dependent uneven-brightness and moiré fringes and to improve visibility.

The present inventors have actually fabricated the liquid crystal display device according to the present invention by way of trial, and evaluated the display characteristics thereof as the angle θ, formed by the extending direction of the projections of the light guide plate of the front light and the extending direction of the projections of the reflector, was varied. The results will now be described.

The angle θ, which is formed by the extending direction of the projections of the light guide plate and the extending direction of the projections of the reflector, was varied in the range of 0° to 70°, and the brightness at the front of the liquid crystal panel and the presence/absence of the generation of interference were measured in each case. The presence/absence of the generation of the interference was evaluated by visually observing the presence/absence of the generation of moiré fringes on the screen. The brightness at the front of the liquid crystal panel was measured with a luminance meter. The results thereof are shown in Table 1. When varying θ, however, only the extending direction of the projections of the light guide plate was varied without changing the arrangement at the reflector side.

TABLE 1

| θ [°] | 0 | 5 | 10 | 30 | 45 | 50 | 70 |
|---|---|---|---|---|---|---|---|
| Interference | Yes | Slight | No | No | No | No | No |
| L [cd/m$^2$] | 50.1 | 50 | 50.1 | 49.8 | 47.8 | 45.9 | 42.7 |

In the case of θ=0° (the extending direction of the projections of the light guide plate and the extending direction of the projections of the reflector are parallel to each other), it was confirmed that interference was generated. In this case, the brightness at the front was 50.1 cd/m$^2$. Next, in the case of θ=5°, it was confirmed that the less interference was generated compared with the case of θ=0°, but was still slightly generated. The brightness at the front was 50.0 cd/m$^2$, which is almost unchanged. Next, in the case of θ=10°, it was confirmed that no interference was generated. The brightness at the front was 50.1 cd/m$^2$, which still remained unchanged. Thereafter, as the angle θ was changed to 30°, 45°, 50°, and 70°, it was confirmed that, while no interference was generated in every case, the brightness at the front tended to decrease as θ increased.

The above results show that, making the value of θ greater, even only by a little, than 0°, that is, displacing the extending directions from being parallel, can reduce the interference, and for complete prevention of the interference, satisfying the expression θ≧10° is desirable.

On the other hand, from the perspective of brightness at the front, as the angle formed by the extending direction of the projections of the light guide plate and the extending direction of the projections of the reflective layer becomes closer to 90°, the brightness tends to decrease since the extending direction of the projections of the light guide plate becomes closer to being parallel to the propagation direction of light within the light guide plate thereby reducing the efficiency of emitting light from the light guide plate. Thus, when the permissible range for a reduction in brightness is within −5% (within a range of a reduction in brightness that cannot be recognized with visual observation) based on the brightness at the front when θ=0°, it is preferable that the expression θ≦45° be satisfied. Thus, it was found that, with respect to a range for θ which can also ensure the prevention of reflected light interference and which can provide substantially the same brightness at the front as for the case of θ=0°, it is desired that the expression 10°≦θ≦45° be satisfied.

Second Embodiment

A second embodiment of the present invention will now be described with reference to FIGS. 4 to 6.

This embodiment is an example of an active-matrix reflective color liquid crystal display device in which a reflective layer that also serves as pixel electrodes is integrated into the inner surface side of the lower substrate.

Figure 4:
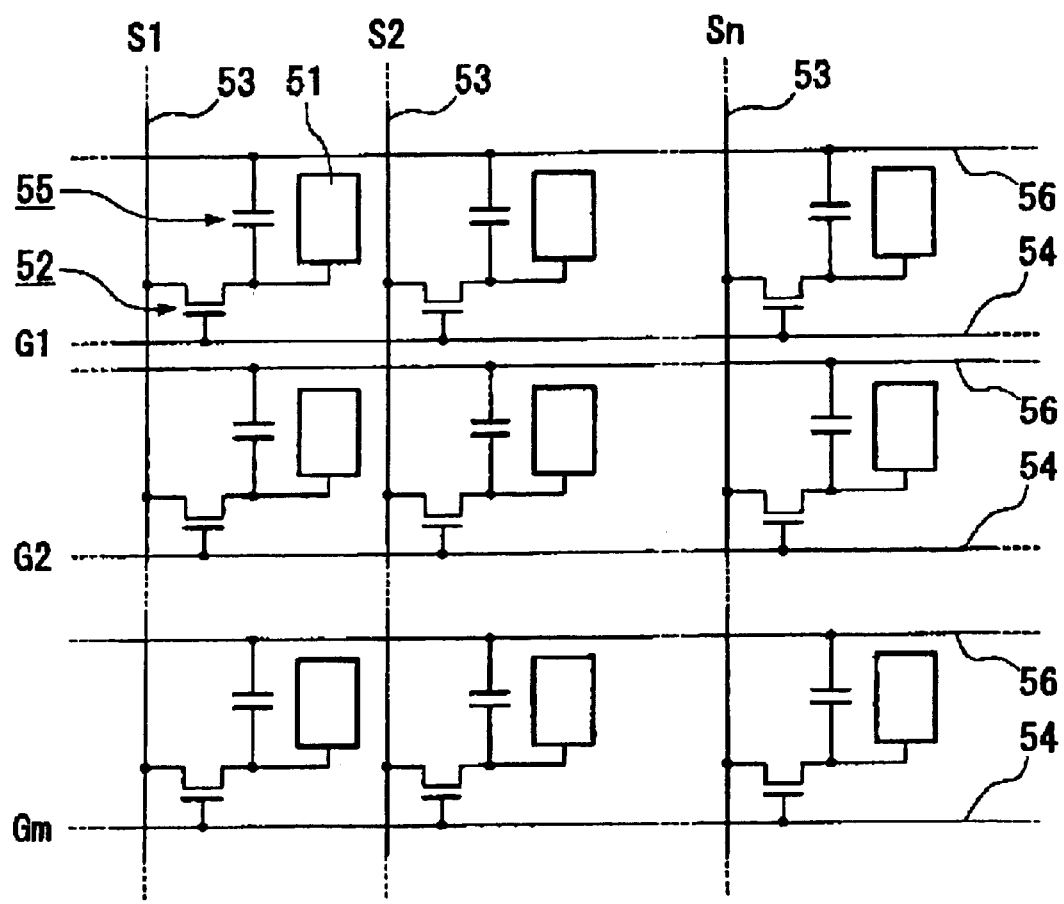
FIG. 4 is an equivalent circuit diagram of a liquid crystal display device according to a second embodiment of the present invention.
Figure 5:
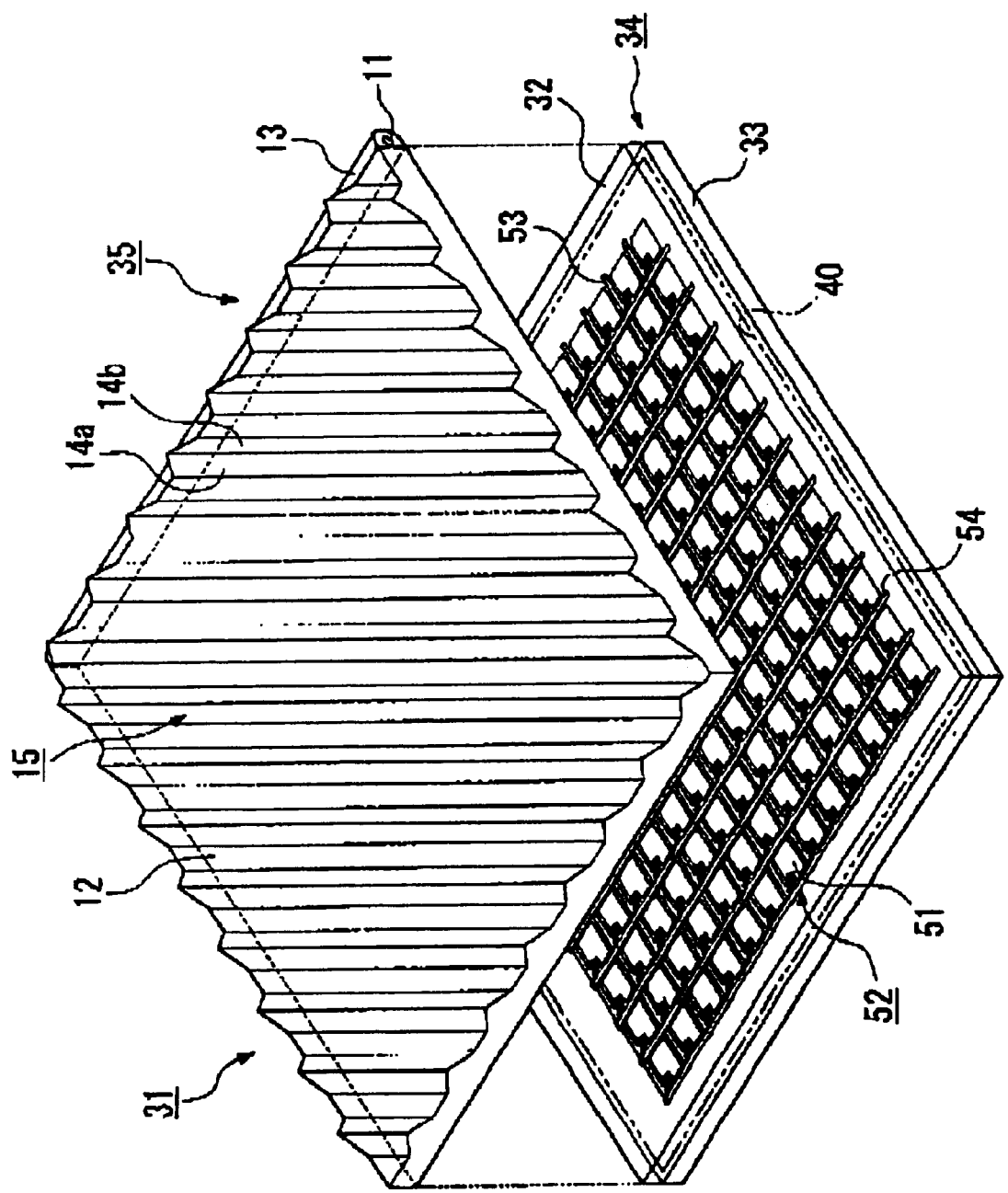
FIG. 5 is an exploded perspective view of the schematic configuration of the liquid crystal display device of the second embodiment.
Figure 6:
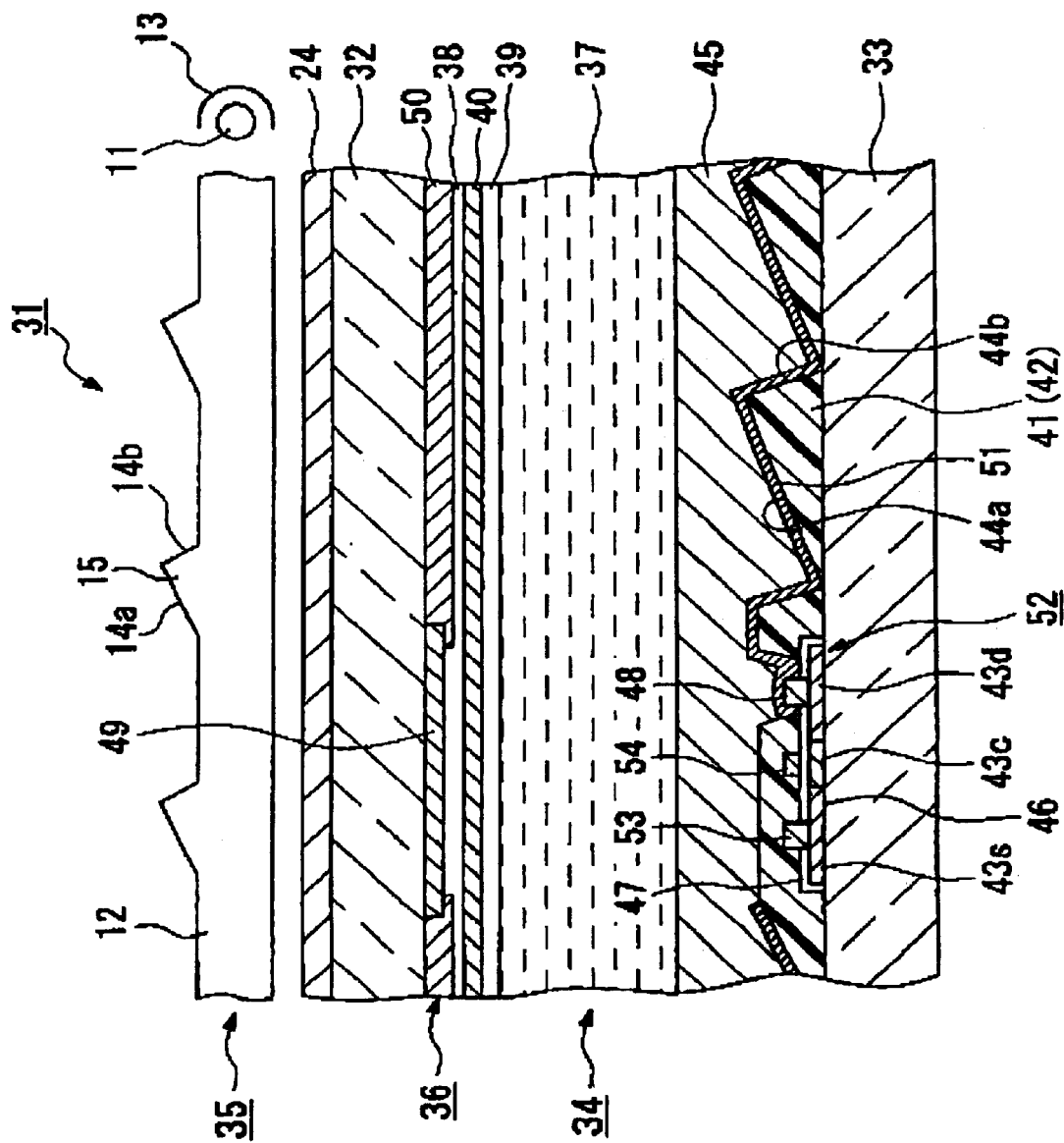
FIG. 6 is a cross-sectional view of an image display region of the liquid crystal display device of the second embodiment.

FIG. 4 is an equivalent circuit diagram of a liquid crystal display device of this embodiment, FIG. 5 is an exploded perspective view illustrating the schematic configuration of the liquid crystal display device, and FIG. 6 is a cross-sectional view of an image display region of the liquid crystal display device. In FIGS. 5 and 6, elements common to those in FIGS. 1 and 3 are denoted with common reference numerals, and the detailed description thereof will be omitted.

In the liquid crystal display device of this embodiment, as shown in FIG. 4, a plurality of pixels that constitute an image display region are arranged in a matrix, and pixel electrodes 51 and thin film transistors 52 (hereinafter simply referred to as "TFTs"), which are switching elements, for controlling the corresponding pixel electrodes 51, are formed for the corresponding pixels. Data lines 53 through which image signals are supplied are electrically connected to corresponding sources of the TFTs 52. Image signals S1, S2, . . . , Sn to be written into the data lines 53 are supplied line sequentially in that order or are supplied group by group to a plurality of neighboring data lines 53. Scanning lines 54 are electrically connected to corresponding gates of the TFTs 52, such that scanning signals G1, G2, . . . , Gm are applied line sequentially to the corresponding scanning lines 54 in a pulsed manner at a predetermined timing. The pixel electrodes 51 are electrically connected to corresponding drains of the TFTs 52. The TFTs 52, which are switching elements, are turned on for a certain period of time, thereby performing writing of the image signals S1, S2, . . . , Sn supplied from the corresponding data lines 53.

The image signals S1, S2, . . . , Sn, each having apredetermined level, that have been written in the liquid crystal via the pixel electrodes 51 are held between the pixel electrodes and a common electrode, which is described later, for a certain period of time. The orientation and order of the molecular association of the liquid crystal change depending on the level of an applied voltage, thereby allowing light modulation and gray scale display. In this case, for leak protection of the held image signals, storage capacitors 55 are added in parallel with corresponding liquid crystal capacitors formed between the pixel electrodes 51 and the common electrode.

As shown in FIG. 5, a liquid crystal display device 31 of this embodiment includes a liquid crystal cell 34 in which liquid crystal, such as TN (twisted nematic) liquid crystal, is sandwiched between a pair of substrates consisting of an opposing substrate 32 (upper substrate) and a TFT array substrate 33 (lower substrate), and a front light 35 (illumination device) arranged at the front surface side (upper surface side) of the liquid crystal cell 34. The liquid crystal cell 34 of this embodiment is suitable for use in an active-matrix type display. The plurality of data lines 53 and the plurality of scanning lines 54 are provided in a lattice on the TFT array substrate 33, and the TFTs 52 and the pixel electrodes 51 are provided for corresponding pixels defined by the data lines 53 and the scanning lines 54. A common electrode 40 is provided on the opposing substrate 32. While not shown in FIG. 5, a polarizer is arranged between the liquid crystal cell 34 and the front light 35.

When this structure is viewed in cross section, as shown in FIG. 6, the TFTs 52 are formed on the TFT array substrate 33, such as a glass substrate, and a resin layer 41 is formed so as to cover the TFTs 52. This resin layer 41 defines projections 42. The pixel electrodes 51 that serve as a reflective layer in the present invention are formed on the surfaces of the projections 42 and are electrically connected to corresponding drain regions 43d of the TFTs 52. Each pixel electrode 51 is formed of a metal film, which includes aluminum, silver or the like having a high light-reflectance. The pixel electrodes serving also as the reflective layer cause reflected light to have directivity. The plurality of projections 42, each having a saw-toothed cross-section, is formed on the upper surfaces of the pixel electrodes so as to extend in one direction. The surfaces of the plurality of projections 42 serve as reflective surfaces. Each of the projections 42 has an asymmetric cross-sectional shape. The area of a gentle-slope portion 44a having a gentle oblique angle is larger than the area of the steep-slope portion 44b having a steep oblique angle.

An alignment layer 45 is formed on the pixel electrodes 51 over an entire surface of the TFT array substrate 33.

More specifically, each TFT 52 is configured as follows. A semiconductor layer 46, made of polycrystalline silicon, is formed on the TFT array substrate 33. A source region 43s and the drain region 43d which are doped with n-type impurities are formed at two ends of the semiconductor layer 46, and a channel region 43c is provided between the source region 43s and the drain region 43d. The semiconductor layer 46 is covered by a gate insulating film 47. Each data line 53 electrically connected to the corresponding source region 43s and a drain electrode 48 electrically connected to the corresponding drain region 43d are provided above the semiconductor layer 46. Each scanning line 54 is arranged with the gate insulating film 47 interposed between the channel region 43c and the scanning line 54. Meanwhile, on the opposing substrate 32, light-shielding films 49 (a black matrix) in the form of a lattice for light shielding for forming regions of TFTs 52 and wiring regions including the data lines 53 and the scanning lines 54 are provided, and a colored layer 50 including R (red), G (green), and B (blue) is also provided in regions corresponding to pixels partitioned by the light-shielding films 49, thereby constituting a color filter 36. In addition, an overcoat layer 38 is formed to planarize steps between the light-shielding films 49 and the colored layer 50, which constitute the color filter 36. The common electrode 40, which is made of a transparent conductive film including ITO or the like, and an alignment layer 39 are sequentially formed over an entire surface of the overcoat layer 38. Liquid crystal 37, such as TN liquid crystal, is held between the TFT array substrate 33 and the opposing substrate 32.

In the first embodiment, since the reflector is provided separately, that is, provided outside the liquid crystal cell, the projections of the reflective layer are formed over the entire surface of the liquid crystal cell. In contrast, in the second embodiment, since the pixel electrodes 51 also serve as a reflective layer, there is a difference in that the projections 42 of the reflective layer are provided only within the regions of the individual pixels. This embodiment, however, is analogous to the first embodiment in that the extending direction of the projections 15 of the light guide plate 12 of the front light 35 and the extending direction of the projections 42 of the pixel electrodes 51 are arranged so as to have a certain angle therebetween. This eliminates light interference and can prevent the generation of location-dependent uneven-brightness or moiré fringes, which thus can provide the same advantages as the first embodiment.

In addition, according to the configuration of this embodiment, the reflective layer, made of metal films, also serves as the pixel electrodes 51, thereby making it possible to simplify the configuration of an active-matrix liquid crystal display device and also to simplify the manufacturing process. While this embodiment has been described in conjunction with an example of an active-matrix system using TFTs as the switching elements, the features of the this embodiment may also be applied to an active-matrix liquid crystal display device using thin film diodes (hereinafter simply referred to as "TFDs").

In such a case, connecting the pixel electrodes that also serve as reflective films to corresponding terminals of the TFDs can simplify the configuration of the device, and also can simplify the manufacturing process, which can thus provide the same advantages as described above.

Electronic Apparatus

Figure 7:
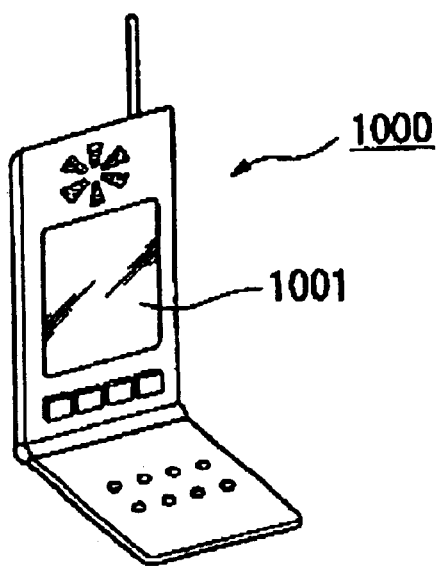
FIG. 7 is a view of an example of an electronic apparatus according to the present invention.

An example of an electronic apparatus having the liquid crystal display device of the above embodiments will now be described. FIG. 7 is a perspective view of an example of a cellular phone. In FIG. 7, reference numeral 1000 indicates a cellular phone body and reference numeral 1001 indicates a liquid crystal display portion using the liquid crystal display device described above.

Figure 8:
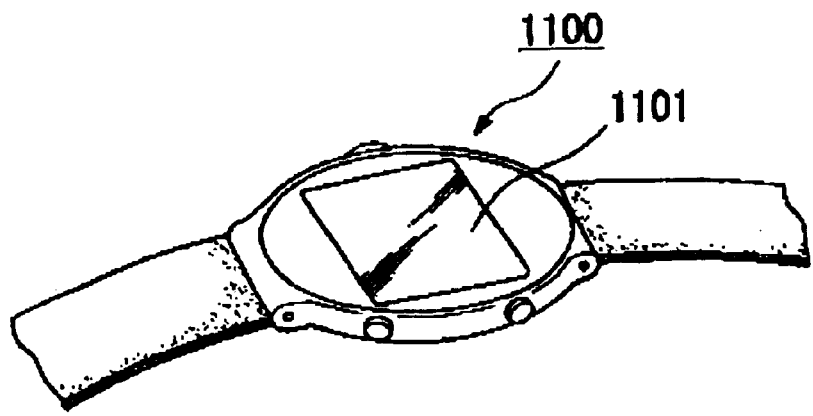
FIG. 8 is a view of another example of an electronic apparatus according to the present invention.

FIG. 8 is a perspective view of an example of a wristwatch-type electronic apparatus. In FIG. 8, reference numeral 1100 indicates a watch body and reference numeral 1101 indicates a liquid crystal display portion using the liquid crystal display device described above.

Figure 9:
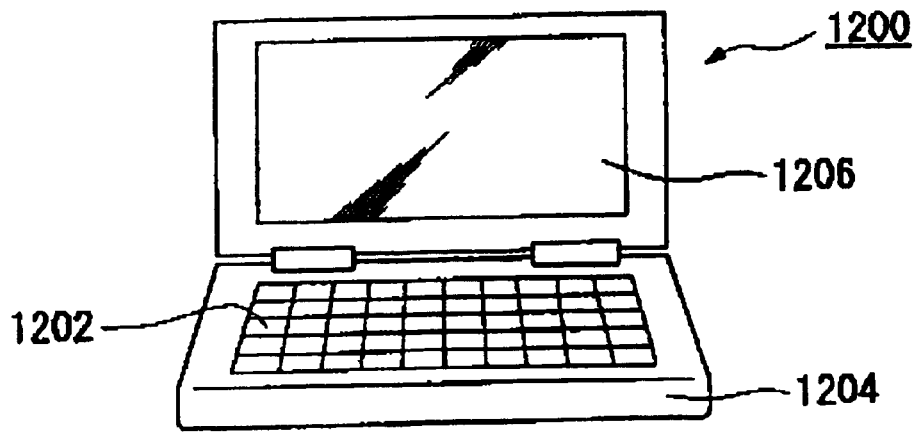
FIG. 9 is a view of still another example of an electronic apparatus according to the present invention.
Figure 10:
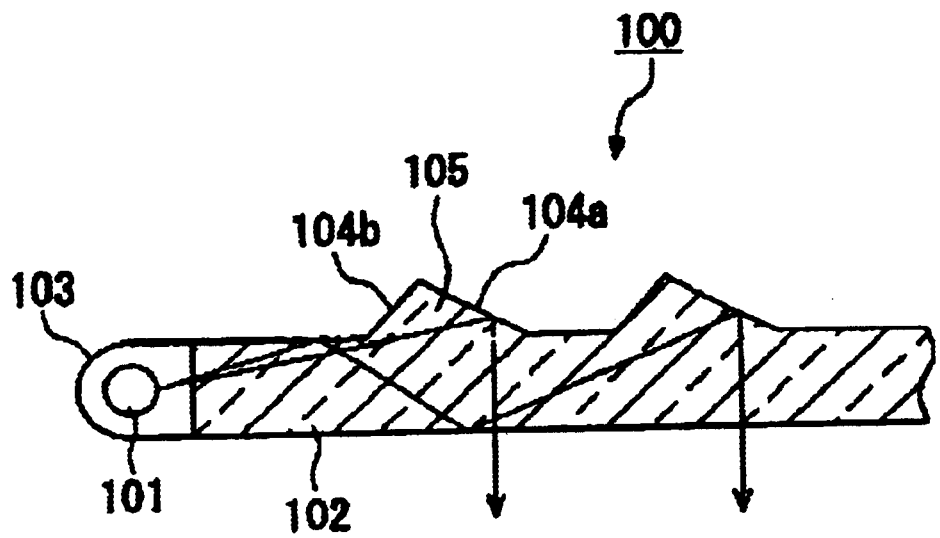
FIG. 10 is a view illustrating the effect of a directional reflector.
Figure 11:
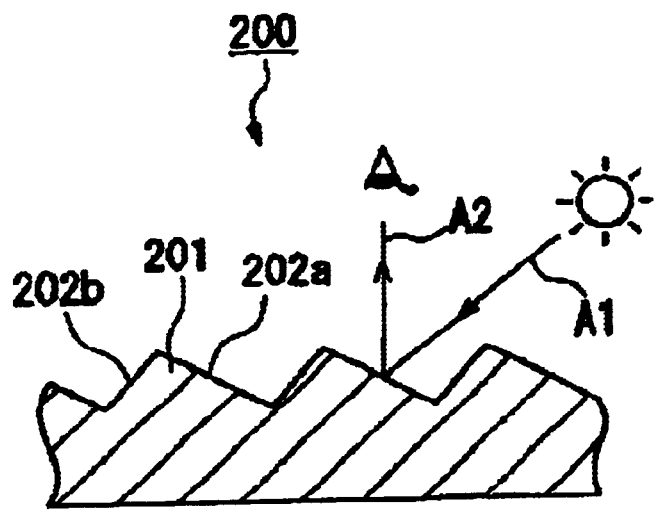
FIG. 11 is a view illustrating the effect of a light guide plate of a front light.

FIG. 9 is a perspective view of an example of a portable information processing apparatus, such as a word processor or a personal computer. In FIG. 9, reference numeral 1200 indicates an information processing apparatus, 1202 is an input portion, such as a keyboard, 1204 is an information processing apparatus body, and 1206 is a liquid crystal display portion using the liquid crystal display device described above.

The electronic apparatuses shown in FIGS. 7 to 9 include the liquid crystal display portion using the liquid crystal display device of the embodiments described above. Such an arrangement, therefore, can achieve an electronic apparatus having a liquid crystal display portion that provides a bright image regardless of an operating environment without generating, for example, location-dependent uneven-brightness or moiré fringes.

The technical scope of the present invention is not limited to the embodiments described above, and thus various changes can be made thereto without departing from the spirit of the present invention. For example, while the description in the above embodiments has been given of examples in which projections are provided on both the light guide plate of the front light and the reflective layer, depressions (the so-called "grooves") may be provided so as to extend in one direction, instead of the projections. The case in which the depressions are arranged in the light guide plate and the reflective layer can also provide the same advantages as in the case in which the projections are provided. In addition, while the description has been given of examples in which each projection has a saw-toothed (triangular) cross-sectional shape, the present invention is not limited thereto. For example, the corners of the projections may be rounded. The reflective surfaces are also not limited to flat, and thus may be curved. Other changes are also possible as appropriate to the specific configurations of the liquid crystal display device described in conjunction with the above embodiments.

Advantages

As detailed in the above, according to the present invention, the extending direction of the projections or depressions of the light guide plate of the illumination device (front light) and the extending direction of the projections or depressions of the reflective layer (directional reflector) are set to be non-parallel to each other. As a result, no light interference is generated. The present invention can achieve a liquid crystal display device that can provide a bright image regardless of an operating environment without causing problems, such as location-dependent uneven-brightness or moiré fringes.

What is claimed is:

1. A reflective liquid crystal display device, comprising:
   a liquid crystal cell including liquid crystal sandwiched between a pair of substrates, the pair of substrates including an upper substrate and a lower substrate, the substrates being arranged so as to oppose each other;
   an illumination device provided at an upper surface side of the liquid crystal cell, the illumination device having a light source and a light guide plate; and
   a reflective layer provided below the liquid crystal of the liquid crystal cell, the light guide plate defining a plurality of projections or depressions extending in one direction, and the reflective layer defining a plurality of projections or depressions extending in another direction, the extending direction of the projections or depressions of the light guide plate and the extending direction of the projections or depressions of the reflective layer being not parallel to each other in plan view.

2. The liquid crystal display device according to claim 1, an angle formed by the extending direction of the projections or depressions of the light guide plate and the extending direction of the projections or depressions of the reflective layer being greaer than 0° and smaller than 90°.

3. The liquid crystal display device according to claim 1, each of the projections or depressions of the reflective layer having an asymmetric cross-sectional shape, the cross-section being taken in a direction perpendicular to the extending direction of the projections or depressions thereof, and having a gentle-slope portion with a gentle oblique angle and a steep-slope portion with an oblique angle steeper than the gentle-slope portion, thereby causing light reflected by the reflective layer to have directivity.

4. The liquid crystal display device according to claim 1, the reflective layer being provided at the inner surface side of the lower substrate.

5. The liquid crystal display device according to claim 1, the reflective layer being provided at the outer surface side of the lower substrate.

6. An electronic apparatus, comprising:
   the liquid crystal display device according to claim 1.

7. The liquid crystal display device according to claim 2, each of the projections or depressions of the reflective layer having an asymmetric cross-sectional shape, the section being taken in a direction perpendicular to the extending direction of the projections or depressions thereof, and having a gentle-slope portion with a gentle oblique angle and a steep-slope portion with an oblique angle steeper than the gentle-slope portion, thereby causing light reflected by the reflective layer to have directivity.

8. The liquid crystal display device according to claim 2, the reflective layer being provided at the inner surface side of the lower substrate.

9. The liquid crystal display device according to claim 3, the reflective layer being provided at the inner surface side of the lower substrate.

10. The liquid crystal display device according to claim 2, the reflective layer being provided at the outer surface side of the lower substrate.

11. The liquid crystal display device according to claim 3, the reflective layer being provided at the outer surface side of the lower substrate.

12. An electronic apparatus, comprising:
    the liquid crystal display device according to claim 2.

13. An electronic apparatus, comprising:
    the liquid crystal display device according to claim 3.

14. An electronic apparatus, comprising:
    the liquid crystal display device according to claim 4.

15. An electronic apparatus, comprising:
    the liquid crystal display device according to claim 5.

* * * * *